(12) United States Patent
Shen et al.

(10) Patent No.: US 12,625,398 B2
(45) Date of Patent: May 12, 2026

(54) LIGHT MODULATION UNIT AND DISPLAY DEVICE THEREOF

(71) Applicant: DARWIN PRECISIONS CORPORATION, Hsinchu County (TW)

(72) Inventors: Wen-Tai Shen, Hsinchu County (TW); Yu-Huan Chiu, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 19/026,714

(22) Filed: Jan. 17, 2025

(65) Prior Publication Data

US 2026/0050184 A1 Feb. 19, 2026

(30) Foreign Application Priority Data

Aug. 13, 2024 (TW) ................................. 113130306

(51) Int. Cl.
G02F 1/13 (2006.01)
F21V 8/00 (2006.01)
G02F 1/1335 (2006.01)

(52) U.S. Cl.
CPC ......... *G02F 1/1323* (2013.01); *G02B 6/0053* (2013.01); *G02F 1/133607* (2021.01); *G02F 1/133627* (2021.01); *G02B 6/0051* (2013.01); *G02F 1/133626* (2021.01)

(58) Field of Classification Search
CPC ... G02B 6/0051; G02B 6/0053; G02F 1/1323; G02F 1/133627
See application file for complete search history.

(56) References Cited

U.S. PATENT DOCUMENTS

| | | | |
|---|---|---|---|
| 10,656,318 B2 * | 5/2020 | Hanashima | .............. G09F 13/18 |
| 11,604,306 B2 | 3/2023 | Chen | |
| 11,874,556 B1 | 1/2024 | Chen et al. | |
| 2005/0002204 A1 * | 1/2005 | Lin | ....................... G02B 6/0053 362/555 |
| 2008/0198295 A1 * | 8/2008 | Yuuki | ................... G02B 6/0053 362/235 |

(Continued)

FOREIGN PATENT DOCUMENTS

| | | |
|---|---|---|
| CN | 103033858 A | 4/2013 |
| CN | 209496159 U | 10/2019 |

(Continued)

*Primary Examiner* — Keith G. Delahoussaye

(57) ABSTRACT

The invention provides a light modulation unit including a collimating optical layer and an optical film. The optical film has a light exit surface and a light entrance surface opposite to the light exit surface. The collimation optical layer and the light entrance surface of the optical film are disposed relatively. The light exit surface forms a plurality of micro-structures, each of which has a height h in the normal direction of the light exit surface and a virtual aperture φ in the x-coordinate axis direction parallel to the light exit surface, and the ratio of the height h to the virtual aperture φ (h/φ) is 0.2 to 1. The light modulation unit of the present invention has the function of adjusting the brightness of anti-peep viewing angles, and can improve the display brightness of front viewing angles through light pattern control.

17 Claims, 10 Drawing Sheets

(56)                    References Cited

U.S. PATENT DOCUMENTS

| 2012/0235891 A1* | 9/2012 | Nishitani | G02F 1/1323 |
| | | | 345/102 |
| 2022/0244435 A1* | 8/2022 | Shen | G01B 11/002 |
| 2023/0101373 A1* | 3/2023 | Kim | G02B 6/0036 |
| | | | 362/613 |
| 2023/0168526 A1 | 6/2023 | Hsieh et al. | |
| 2024/0264486 A1* | 8/2024 | Chen | G02F 1/133603 |
| 2024/0295686 A1 | 9/2024 | Chen et al. | |

FOREIGN PATENT DOCUMENTS

| CN | 116449604 A | 7/2023 |
| CN | 117389081 A | 1/2024 |

* cited by examiner

LIGHT MODULATION UNIT AND DISPLAY DEVICE THEREOF

FIELD OF THE INVENTION

The present invention relates to a light modulation unit, particularly a light modulation unit for adjusting the brightness of anti-peep viewing angles and a display device thereof.

BACKGROUND OF THE INVENTION

With the increasing awareness of privacy protection, display devices with an anti-peep function are becoming more popular. In the prior art, a light control film is arranged to adjust the light emission angle, allowing light to be emitted within a small viewing angle range, thus providing the user visibility at the orthogonal angle and restricting visibility at non-orthogonal angles. FIG. 1 is a curve of a viewing angle and brightness of a display device in a comparative example of the prior art. As shown in FIG. 1, when a user views an image at the orthogonal angle, the brightness significantly decreases as the viewing angle increases, causing viewing discomfort to the user. Thus, those in this industry are eager to resolve the issue of viewing discomfort with the anti-peep display devices.

SUMMARY OF THE INVENTION

The present invention provides a light modulation unit that can alleviate the situation where the brightness significantly decreases as the viewing angle increases when the user views the image at the orthogonal angle, thereby enhancing viewing comfort.

The light modulation unit provided by the present invention includes an optical film and a collimating optical layer. The optical film has a light exit surface and a light entrance surface opposite to the light exit surface. A plurality of microstructures are formed on the light exit surface, and each microstructure has a plurality of boundaries. Each microstructure has the boundary connected to a boundary of a microstructure adjacent thereto, and an orthographic projection of the boundary of each microstructure on the light exit surface is polygonal. Each microstructure has a height h in the normal direction of the light exit surface and a virtual aperture $\varphi$ in the x-coordinate axis direction parallel to the light exit surface, and the ratio (h/$\varphi$) of the height h to the virtual aperture $\varphi$ is 0.2 to 1. The collimating optical layer is opposite to the light entrance surface of the optical film.

In an embodiment of the present invention, the ratio (h/$\varphi$) of the height h to the virtual aperture $\varphi$ is 0.3 to 0.7.

In an embodiment of the present invention, the microstructures each have a surface profile, and the surface profile satisfies the following functional form:

$$s(x) = \frac{x^2}{R + \sqrt{R^2 + (k+1)x^2}}$$

Where s(x) represents the surface profile of each of the microstructures in an x-coordinate axis, value x represents a position of a vertical projection of the surface profile on the x-coordinate axis, value R represents a curvature radius of a vertex of each of the microstructures, value k represents a conic constant of each of the microstructures, and the microstructures have the same value R and value k.

In an embodiment of the present invention, a ratio (k/R) of the conic constant to the curvature radius satisfies the following condition: $-187.5$ 1/µm$\leq$k/R$\leq$$-20$ 1/µm.

In an embodiment of the present invention, the microstructures are each suitable for forming a light type, the light type has a viewing angle, and the viewing angle satisfies the following functional form:

$$FOV = A(k/R) + B$$

Where FOV represents the viewing angle of the light type, and value A and value B satisfy the following condition: $-0.1\leq$A$\leq$$-1$, and B is a constant greater than 0.

In an embodiment of the present invention, the conic constant k satisfies the following condition: $-1.5\leq$k$\leq$$-0.8$.

In an embodiment of the present invention, the curvature radius R satisfies the following condition: 0.008 µm$\leq$R$\leq$0.04 µm.

In an embodiment of the present invention, the virtual aperture $\varphi$ of each of the microstructures satisfies the following condition: 10 µm$\leq$$\varphi$$\leq$250 µm.

In an embodiment of the present invention, the virtual aperture $\varphi$ of each of the microstructures is a difference between two adjacent values x when the functional form s(x) of the surface profile is 0 and satisfies the following condition: 10 µm$\leq$$\varphi$$\leq$250 µm.

In an embodiment of the present invention, the height h of each of the microstructures satisfies the following condition: 10 µm$\leq$h$\leq$50 µm.

In an embodiment of the present invention, the height h of each of the microstructures is a maximum value of the functional form s(x) of the surface profile and satisfies the following condition: 10 µm$\leq$h$\leq$50 µm.

In an embodiment of the present invention, the microstructures protrude from or recess into the light exit surface.

In an embodiment of the present invention, a material of the optical film may be polycarbonate, polyethylene terephthalate, polypropylene, polyvinyl chloride, polydimethylsiloxane, or a combination thereof.

In an embodiment of the present invention, the collimating optical layer is an anti-peep film or lens.

The present invention further provides a display device, including the foregoing light modulation unit, a display panel, and a first light emitting unit. The display panel is opposite to the light exit surface of the optical film, the first light emitting unit is opposite to the collimating optical layer of the light modulation unit, and the light modulation unit is located between the display panel and the first light emitting unit. The first light emitting unit emits an initial light beam to the collimating optical layer, the initial light beam passes through the collimating optical layer to form a collimated beam, the collimated beam passes through the light entrance surface to enter the optical film and then exits from the microstructures of the light exit surface to form a divergent light beam, and the divergent light beam has a divergence angle $\theta$ relative to a normal of the light entrance surface.

In an embodiment of the present invention, the first light emitting unit includes a first light guide plate and a first light source. The first light guide plate has a side surface, and the first light source is disposed on the side surface of the first light guide plate.

In an embodiment of the present invention, the first light emitting unit includes a first light guide plate and a first light source. The first light guide plate has an upper surface adjacent to the collimating optical layer, and the first light source is disposed on the upper surface of the first light guide plate.

In an embodiment of the present invention, the display device further includes a second light emitting unit disposed between the display panel and the optical film. The second light emitting unit includes a second light guide plate and a second light source disposed on a side surface of the second light guide plate. The display device is able to switch between a plurality of modes as follows. A privacy mode: when the first light emitting unit is turned on and the second light emitting unit is turned off, the divergent light beam passes through the second light emitting unit and the display panel to form a first emitted light beam, and the first emitted light beam has a first maximum light emission angle relative to a normal of a plane of the display panel away from the light exit surface of the optical film. A sharing mode: when the first light emitting unit is turned on and the second light emitting unit is turned on, at least one light beam emitted by the second light emitting unit passes through the second light emitting unit and the display panel to form a second emitted light beam, the second emitted light beam has a second maximum light emission angle relative to the normal of the plane of the display panel away from the light exit surface of the optical film, and the first maximum light emission angle is less than the second maximum light emission angle.

In an embodiment of the present invention, when $\theta=0$ degrees, the divergent light beam has first brightness; and when 0 degrees$<\theta\leq20$ degrees or $-20$ degrees$<\theta\leq0$ degrees, the divergent light beam has second brightness, the second brightness being 90%-105% of the first brightness.

According to the present invention, a collimating optical layer is combined with an optical film having microstructures on the light exit surface, enhancing the display brightness at the orthogonal angle through light type control, and achieving the anti-peep effect.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

Regarding the aforementioned and other technical contents, features, and effects of the present invention, they will be clearly presented in the following detailed description of a preferred embodiment with reference to the accompanying drawings. Directional terms used in the following embodiments, such as "up", "down", "left", "right", "front", and "back", are used for only references to the directions in the accompanying drawings. Therefore, the directional terms used are for explanation purposes and not to limit the present invention. Moreover, the terms "first," "second," and the like, mentioned in this specification or patent claims are used to name elements (elements) or distinguish different embodiments or ranges, and are not intended to limit the upper or lower limits of the number of elements.

Figure 1:
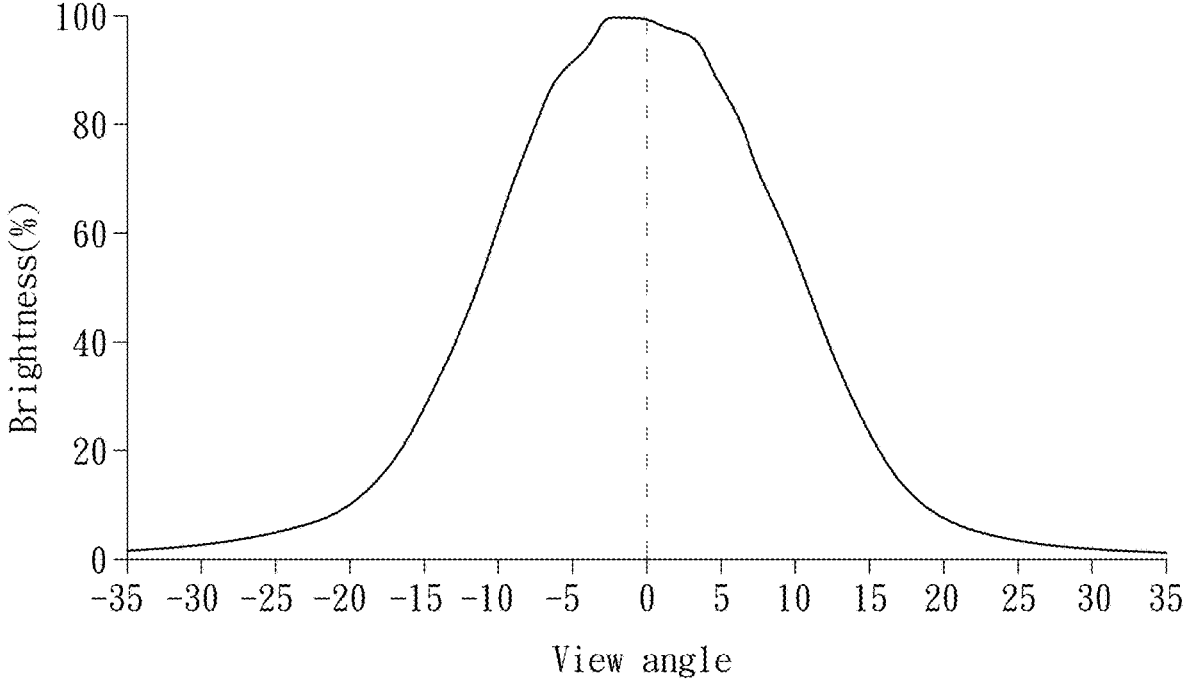
FIG. 1 is a curve of a viewing angle and brightness of a display device in a comparative example of the prior art.
Figure 2:
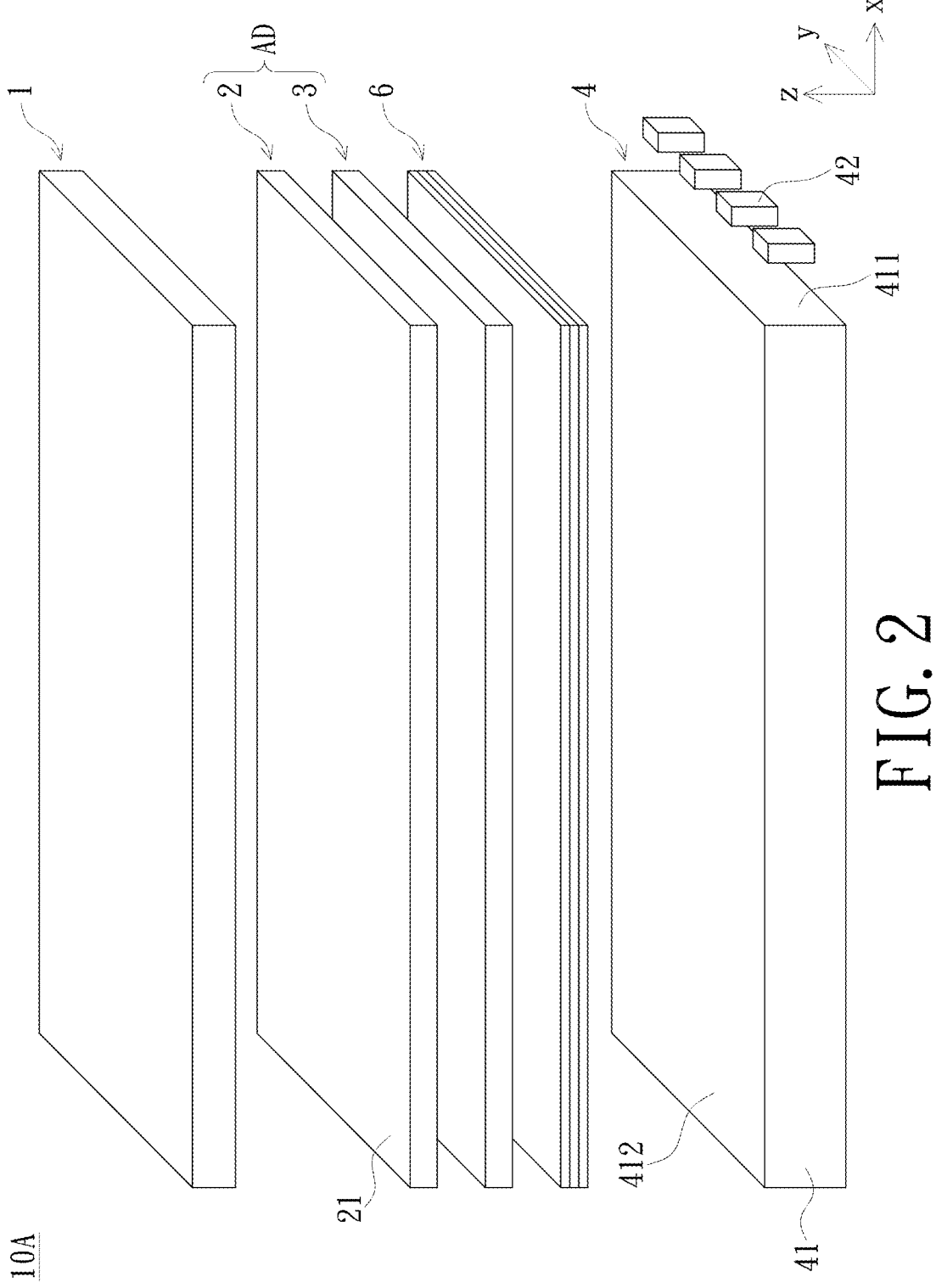
FIG. 2 is a schematic three-dimensional diagram of a display device according to a first embodiment of the present invention.
Figure 3:
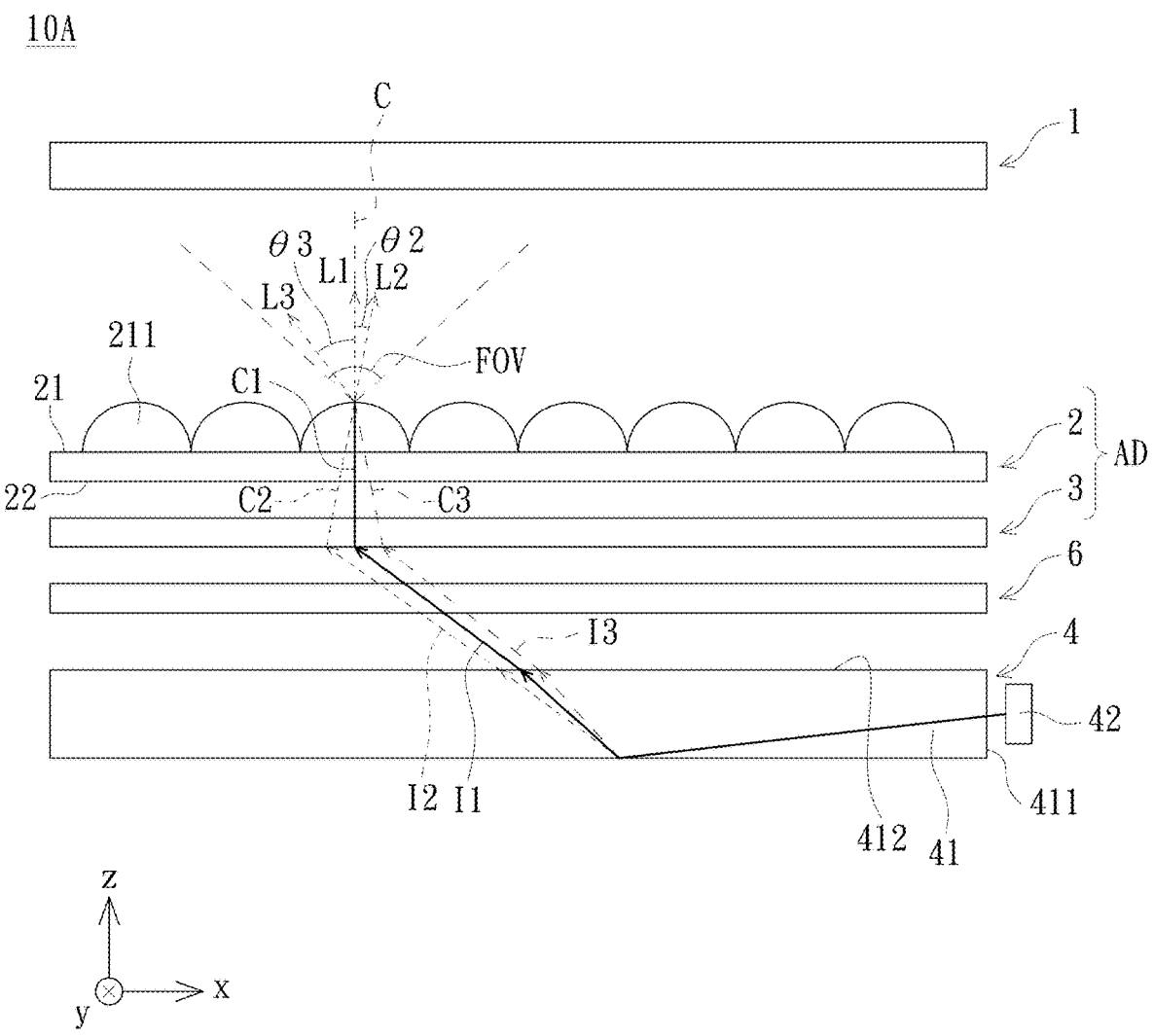
FIG. 3 is a schematic cross-sectional view of the display device along a plane XZ according to the first embodiment of the present invention.

As shown in FIGS. 2 and 3, a display device 10A of the first embodiment of the present invention includes a display panel 1, a light modulation unit AD, a laminated optical layer 6, and a first light emitting unit 4. The light modulation unit AD is disposed between the display panel 1 and the first light emitting unit 4, and the laminated optical layer 6 is disposed between the light modulation unit AD and the first light emitting unit 4. The following are respective descriptions.

The display device 10A may be a notebook computer, a tablet computer, a mobile phone, or a display used in other electronic devices, but is not limited thereto. The display panel 1 may be a liquid crystal display panel or another suitable transmissive or non-self-luminous display panel, but is not limited thereto.

The light modulation unit AD includes an optical film 2 and a collimating optical layer 3. The optical film 2 has a light exit surface 21 and a light entrance surface 22 opposite to the light exit surface 21. The collimating optical layer 3 is opposite to the light entrance surface 22 of the optical film 2. Specifically, the display panel 1 is opposite to the light exit surface 21 of the optical film 2, and the first light emitting unit 4 is disposed on the side of the collimating optical layer 3 away from the optical film 2.

The detailed structure of the optical film 2 is described as follows: As shown in FIGS. 2 to 5, the optical film 2 has a light exit surface 21 and a light entrance surface 22 opposite to the light exit surface 21. The optical film 2 has a plurality of microstructures 211 arranged on the light exit surface 21, to change the traveling direction of the collimated beam emitted from the collimating optical layer 3, thereby forming a divergent light beam with a specific angle that exits the optical film 2. Each microstructure 211 has a plurality of boundaries 212, and the orthographic projection of the boundary 212 on the light exit surface 21 may be polygonal. Any two microstructures may be of the same or different shapes, and the boundary 212 of each microstructure 211 is connected to a boundary 212 of an adjacent microstructure 211, ensuring no blank region between adjacent microstructures 211. The optical film 2 may be, for example, a microlens array optical film, but is not limited thereto. The material of the optical film 2 may be plastic, for example but not limited to polycarbonate (PC), polyethylene terephthalate (PET), polypropylene (PP), polyvinyl chloride (PVC), and polydimethylsiloxane (PDMS). The optical film 2 may be manufactured through ultra-precision machining technology (ultra-precision machining technology), laser writer/laser pattern (laser writer/laser pattern), or other suitable methods, but is not limited thereto.

Figure 4:
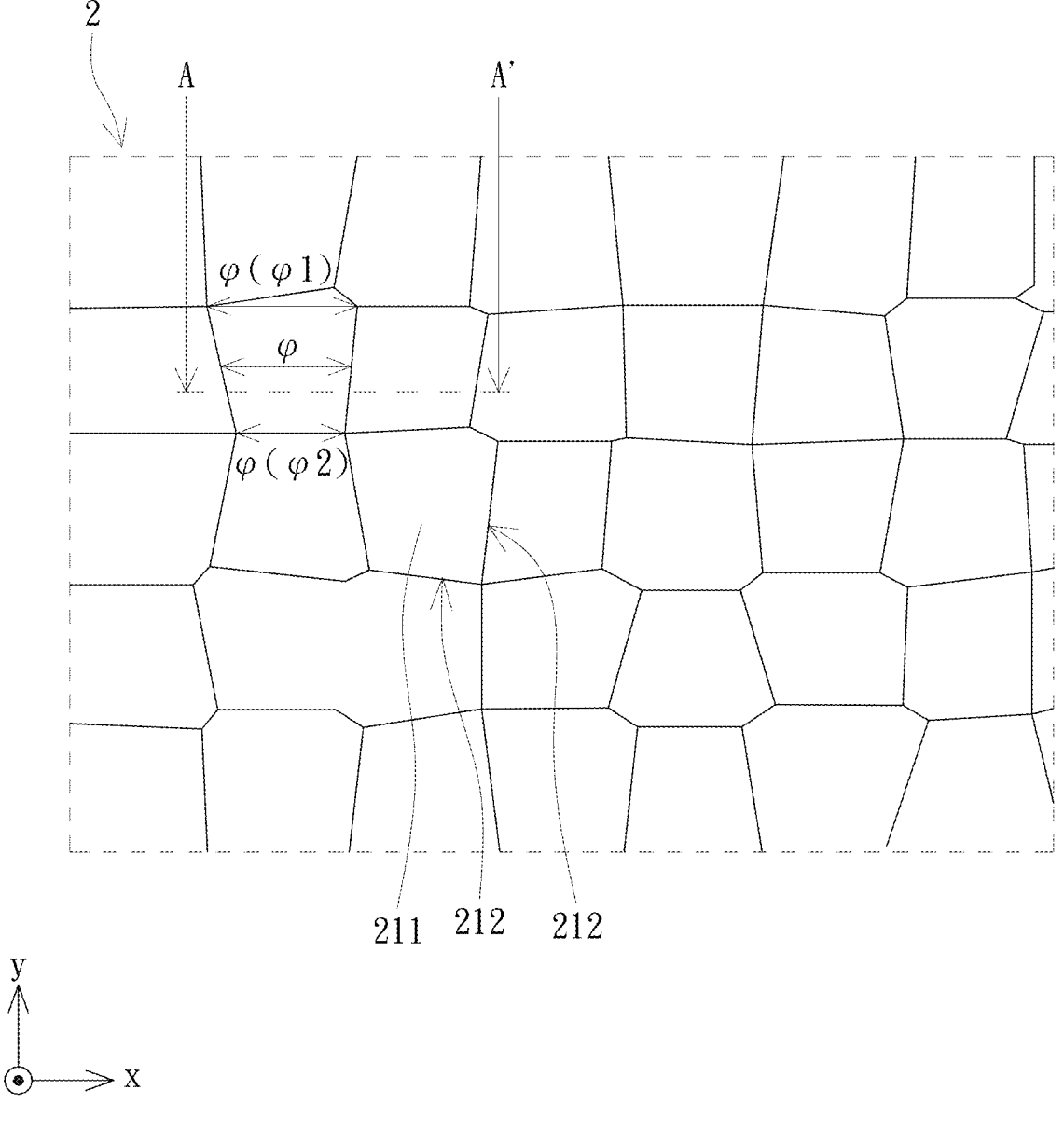
FIG. 4 is a schematic top view of an optical film according to the first embodiment of the present invention.
Figure 5:
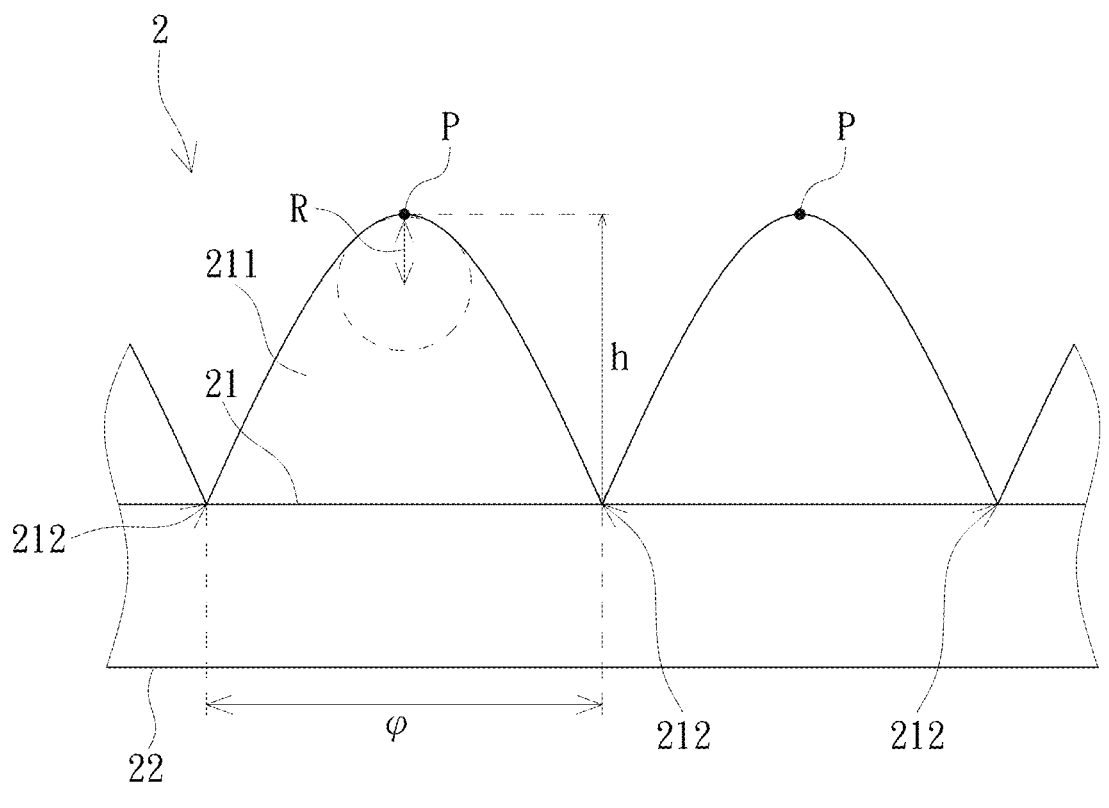
FIG. 5 is a schematic cross-sectional view of the optical film taken along line A-A' according to the first embodiment of the present invention.

As shown in FIGS. 4 and 5, each microstructure 211 of the optical film 2 has a surface profile, and the surface profile has the following functional form:

$$s(x) = \frac{x^2}{R + \sqrt{R^2 + (k+1)x^2}}$$

Where s(x) represents the surface profile of each of the microstructures 211 in an x-coordinate axis, value x represents a position of a vertical projection of the surface profile on the x-coordinate axis, value R represents a curvature radius of a vertex P of each of the microstructures 211, and value k represents a conic constant of each of the microstructures 211. The curvature radius R satisfies the following condition: 0.008 µm≤R≤0.04 µm, for example but not limited to 0.01 µm, 0.015 µm, 0.02 µm, 0.025 µm, 0.03 µm, and 0.035 µm. The conic constant k satisfies the following condition: −1.5≤k≤−0.8, for example but not limited to −1.4, −1.3, −1.2, −1.1, −1.0, and −0.9. The ratio (k/R) of the conic constant k to the curvature radius R satisfies the following condition: −187.5 1/µm≤k/R≤−20 1/µm, for example but not limited to −180 1/µm, −160 1/µm, −140 1/µm, −120 1/µm, −100 1/µm, −80 1/µm, −60 1/µm, and −40 1/µm. The virtual aperture φ of each microstructure 211 may be, for example, the difference between two adjacent values x when the functional form s(x) of the surface profile is 0. The functional form of the surface profile of each microstructure 211 of the optical film 2 mentioned above is only for illustration and is not limited to the above functional form. Users can adjust the functional form based on their needs.

In addition, each microstructure 211 has a height h from the light exit surface 21 to the highest point (the vertex P) in the normal direction of the light exit surface 21, meaning that the microstructure 211 protrudes from the light exit surface 21. The height h satisfies the following condition: 10 µm≤h≤50 µm, for example but not limited to 15 µm, 20 µm, 25 µm, 30 µm, 35 µm, 40 µm, and 45 µm. In another embodiment, each microstructure 211 has a lowest point below the light exit surface 21, meaning that the microstructure 211 recesses into the light exit surface 21 (not shown in the figure). Each microstructure 211 has a virtual aperture φ in the x-coordinate axis direction parallel to the light exit surface 212. The virtual aperture φ has, for example, a maximum virtual aperture (φ1) and a minimum virtual aperture (φ2). The maximum virtual aperture (φ1) and the minimum virtual aperture (φ2) respectively are, for example, the maximum value and the minimum value of the microstructure 211 in the x-coordinate axis direction parallel to the light exit surface 21, but are not limited thereto. The virtual aperture φ satisfies the following condition: 10 µm≤φ≤250 µm, for example but not limited to 30 µm, 50 µm, 80 µm, 100 µm, 130 µm, 150 µm, 180 µm, 200 µm, and 230 µm. The ratio (h/φ) of the height h to the virtual aperture φ is 0.2-1, for example but not limited to 0.3, 0.4, 0.5, 0.6, 0.7, 0.8, and 0.9. In other embodiments, the ratio (h/φ) of the height h to the virtual aperture φ may be 0.3-0.7, for example but not limited to 0.35, 0.4, 0.45, 0.5, 0.55, 0.6, and 0.65.

The collimating optical layer 3 is opposite to the light entrance surface 22 of the optical film 2. The collimating optical layer 3 may be, for example, a light control film or lens, where the light control film may have, for example, a grating structure, and the lens may be, for example, a convex lens or a concave lens, but is not limited thereto. The collimating optical layer 3 can achieve light beam collimating and anti-peep effects by, for example, limiting the traveling direction of the light beam or emitting light at a specific angle of structural design.

The first light emitting unit 4 includes a first light guide plate 41 and a plurality of first light sources 42, where the first light guide plate 41 has a plurality of side surfaces 411 and an upper surface 412 adjacent to the collimating optical layer 3. The plurality of first light sources 42 are disposed on at least one of the side surfaces 411. In this embodiment, the plurality of first light sources 42 are disposed on one of the plurality of side surfaces 411 of the first light guide plate 41, but are not limited thereto. In other embodiments, the plurality of first light sources 42 may also be disposed on the plurality of side surfaces 411 of the first light guide plate 41 simultaneously. Furthermore, in this embodiment, the first light emitting unit 4 is a side-lit light emitting unit, but is not limited thereto. In other embodiments, the first light emitting unit 4 may also be a direct-lit light emitting unit or a full-array light emitting unit.

The laminated optical layer 6 may include, for example but not limited to, a diffusion film, a diffusion plate, and a structural plate, suitable for enhancing the uniformity of the light source. Although the laminated optical layer 6 is present in the display device 10A of this embodiment, it is not limited thereto. In other embodiments, the laminated optical layer 6 may not be used.

The operation of the display device 10A of this embodiment is described in detail below with reference to FIGS. 2 and 3: First, the first light emitting unit 4 is used to emit initial light beams I1, I2, and I3 to the collimating optical layer 3. Specifically, when the first light source 42 is turned on, the first light source 42 emits light beams, which are incident into the first light guide plate 41 from the side surface 411 and exit from the upper surface 412. Next, the initial light beams I1, I2, and I3 are incident into the collimating optical layer 3 and exit, forming collimated beams C1, C2, and C3, thereby limiting the visible angle of the display device 10A and providing an anti-peep function. Then, the collimated beams C1, C2, and C3 are incident into the optical film 2, and pass through the microstructures 211 of the light exit surface 21, forming divergent light beams L1, L2, and L3, which exit at specific angles, enhancing display brightness at the orthogonal angle through light type control. Finally, the divergent light beams L1, L2, and L3 are incident into the display panel 1 and exit. It should be noted that the number of light beams mentioned here is only for illustrative purposes and is not limited thereto.

Figure 10:
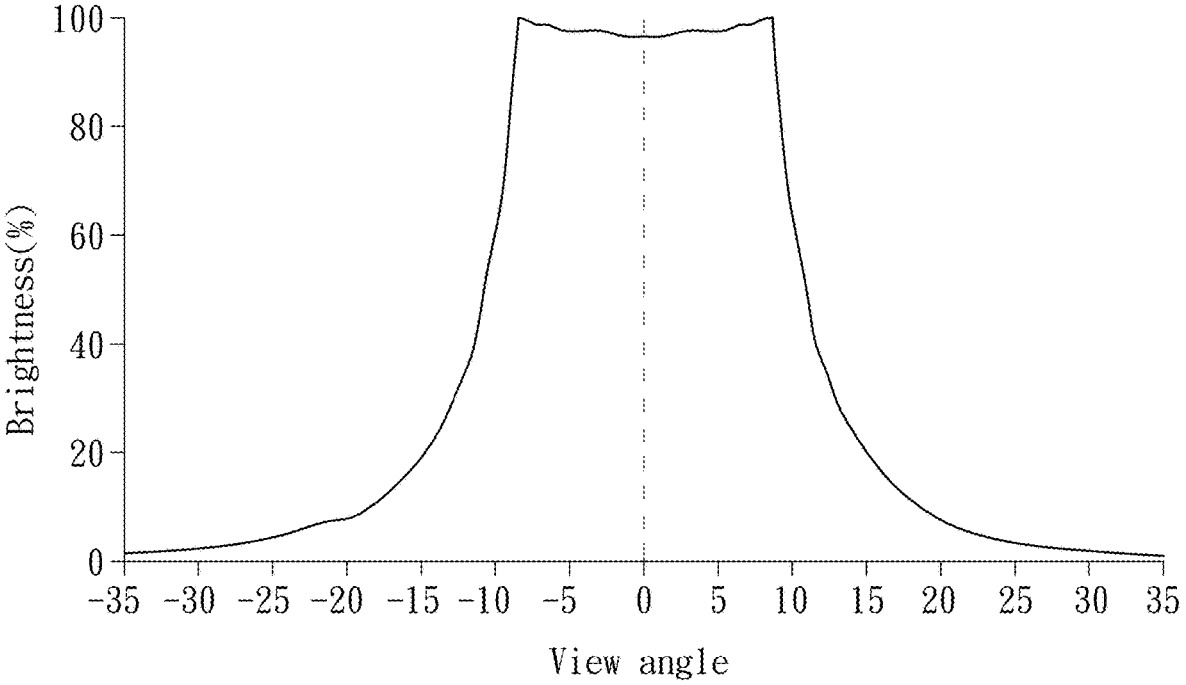
FIG. 10 is a curve of a viewing angle and brightness of the display device according to the first embodiment of the present invention.

Specifically, when the collimated beams C1, C2, and C3 emitted from the collimating optical layer 3 are incident into the light entrance surface 22 of the optical film 2 and pass through the microstructures 211 of the light exit surface 21 to form divergent light beams L1, L2, and L3, the divergent light beams L1, L2, and L3 have a viewing angle FOV, meaning that each microstructure 211 is suitable for forming a light type with the viewing angle FOV. The viewing angle has the following functional form:

$$FOV = A(k/R) + B$$

Where FOV represents the viewing angle of the light type, and value A and value B satisfy the following condition: $-0.1 \leq A \leq -1$, and B is a constant greater than 0. For example, the value A is for example but not limited to $-0.05$, 0, and 0.05, and the value B is for example but not limited to 1, 2.5, 5, 7.5, and 10. In an embodiment, the viewing angle is between 20° and 150°, for example but not limited to 30°, 40°, 50°, 60°, 70°, 80°, 90°, 100°, 110°, 120°, 130°, and 140°. Refer to FIG. 10. When the light beam exits from the microstructures 211 of the optical film 2 and has a maximum angle of 35° relative to the normal of the light entrance surface 22, the display device 10A has, for example, a light type with a viewing angle of 70°. Through the design of the microstructures 211, the light beam can exit at different angles, and the display device 10A can thus have different viewing angles. It can be seen that the present invention can enhance the display brightness at the orthogonal angle by controlling the light type. The angles and viewing angles are only for illustration, and are not specifically limited in the present invention.

Refer to FIGS. 2, 3, and 10. The divergent light beams L1, L2, and L3 have corresponding divergence angles θ1, θ2, and θ3 relative to the normal C of the light entrance surface 22. When the divergence angle θ1=0 degrees, the divergent light beam L1 has first brightness. In an embodiment of the present invention, when 0 degrees<θ2≤20 degrees or $-20$ degrees≤θ2<0 degrees, the divergent light beam L2 has second brightness, the second brightness being 90%-105% of the first brightness. This range, for example, includes 91%, 92%, 93%, 94%, 95%, 96%, 97%, 98%, 99%, 100%, 101%, 102%, 103%, and 104%. In this way, when the user's viewing angle is between-20 degrees and 20 degrees, 90%-105% of the brightness at 0 viewing degrees can still be maintained, thus alleviating the situation where the brightness significantly decreases as the viewing angle increases when the user views the image at the orthogonal angle. When θ3≥20 degrees or θ3≤$-20$ degrees, the divergent light beam L3 has third brightness. The third brightness is less than the first brightness, for example, the third brightness being less than or equal to 85% of the first brightness. When θ3 increases relative to 20 degrees or decreases relative to $-20$ degrees, the difference between the third brightness and the first brightness becomes larger. For example, the brightness of the divergent light beam L3, when θ3=25 degrees, is less than or equal to 85% of the first brightness, and the brightness of the divergent light beam L3, when θ3=35 degrees, is less than or equal to 1% of the first brightness. The above relationship between the third brightness and the first brightness is only for illustration, and is not specifically limited in the present invention. In this way, when the user's viewing angle is less than or equal to $-20$ degrees or greater than or equal to 20 degrees, the viewing brightness is lower than that in a case of the viewing angle being 0 degrees, and as the viewing angle increases relative to 20 degrees or decreases relative to $-20$ degrees, the viewing brightness becomes increasingly dark, achieving the anti-peep effect.

In another embodiment of the present invention, the divergence angle θ1=0 degrees, and the divergent light beam L1 has a first brightness. The divergence angle θ2 satisfies 0 degrees<θ2≤15 degrees or $-15$ degrees≤θ2<0 degrees, and the divergent light beam L2 has second brightness, the second brightness being 95%-105% of the first brightness. The divergence angle θ3 satisfies θ3≥15 degrees or θ3≤15 degrees, the divergent light beam L3 has third brightness, the third brightness being less than the first brightness. When θ3 increases relative to 15 degrees or decreases relative to $-15$ degrees, the difference between the third brightness and the first brightness becomes larger. In still another embodiment of the present invention, the divergence angle θ1=0 degrees, and the divergent light beam L1 has first brightness. The divergence angle θ2 satisfies 0 degrees<θ2≤10 degrees or $-10$ degrees≤θ2<0 degrees, and the divergent light beam L2 has second brightness, the second brightness being 95%-105% of the first brightness. The divergence angle θ3 satisfies θ3≥10 degrees or θ3≤10 degrees, and the divergent light beam L3 has third brightness, the third brightness being less than the first brightness. When θ3 increases relative to 10 degrees or decreases relative to $-10$ degrees, the difference between the third brightness and the first brightness becomes larger. The divergence angles θ1, θ2, and θ3 are only for illustration, and are not specifically limited in the present invention and can be adjusted as needed. In summary, through the control of the light type by the light modulation unit AD, the brightness of the divergent light beam L3 with a divergence angle θ3 can be limited, and the brightness of the divergent light beam L2 with a divergence angle θ2 can be enhanced, reducing the brightness difference between the divergent light beams L1 and L2 corresponding to the divergence angles θ1 and θ2. This not only achieves the anti-peep effect but also enhances the viewing comfort of the user at the orthogonal angle.

Figure 6:
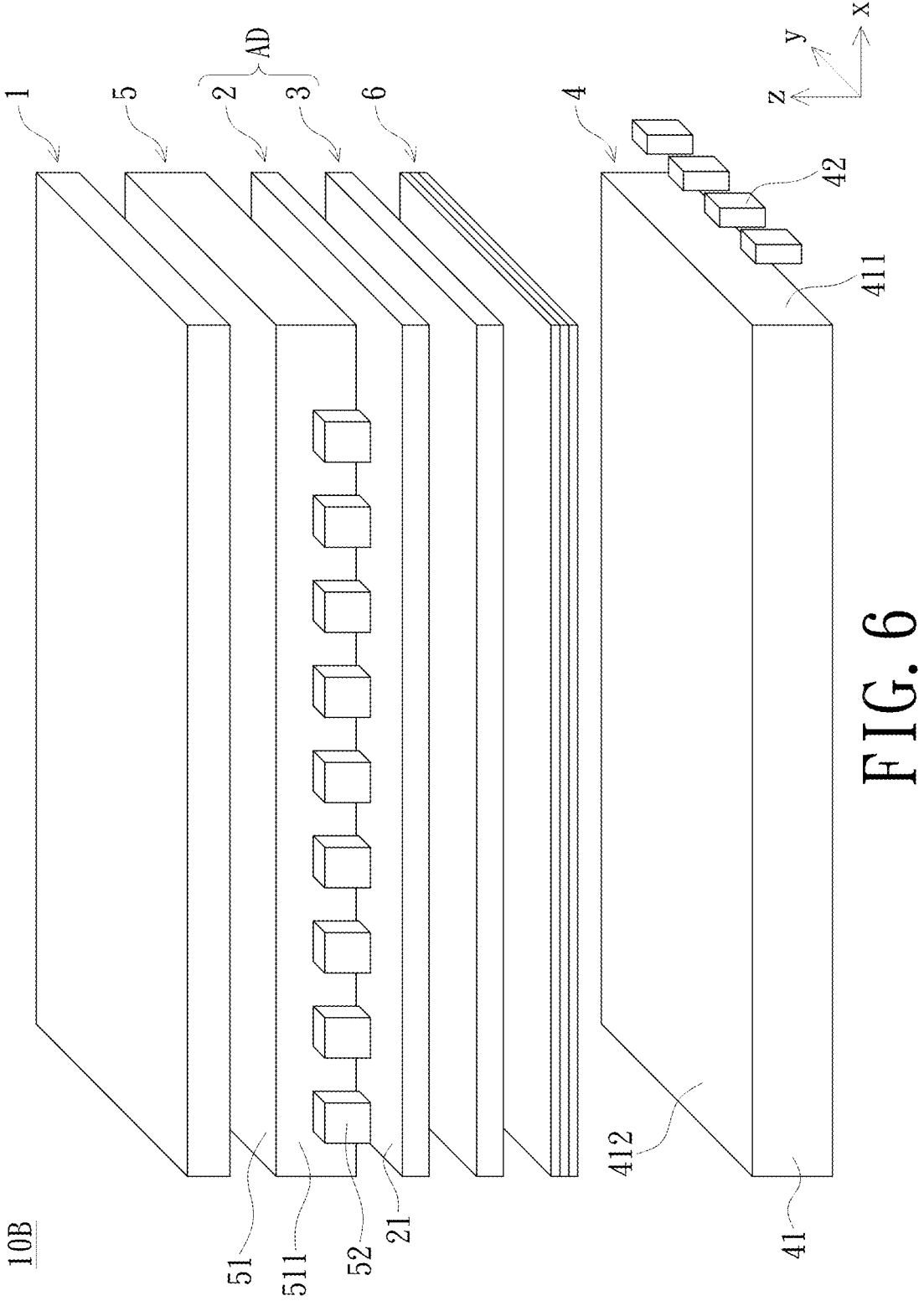
FIG. 6 is a schematic three-dimensional diagram of a display device according to a second embodiment of the present invention.
Figure 7:
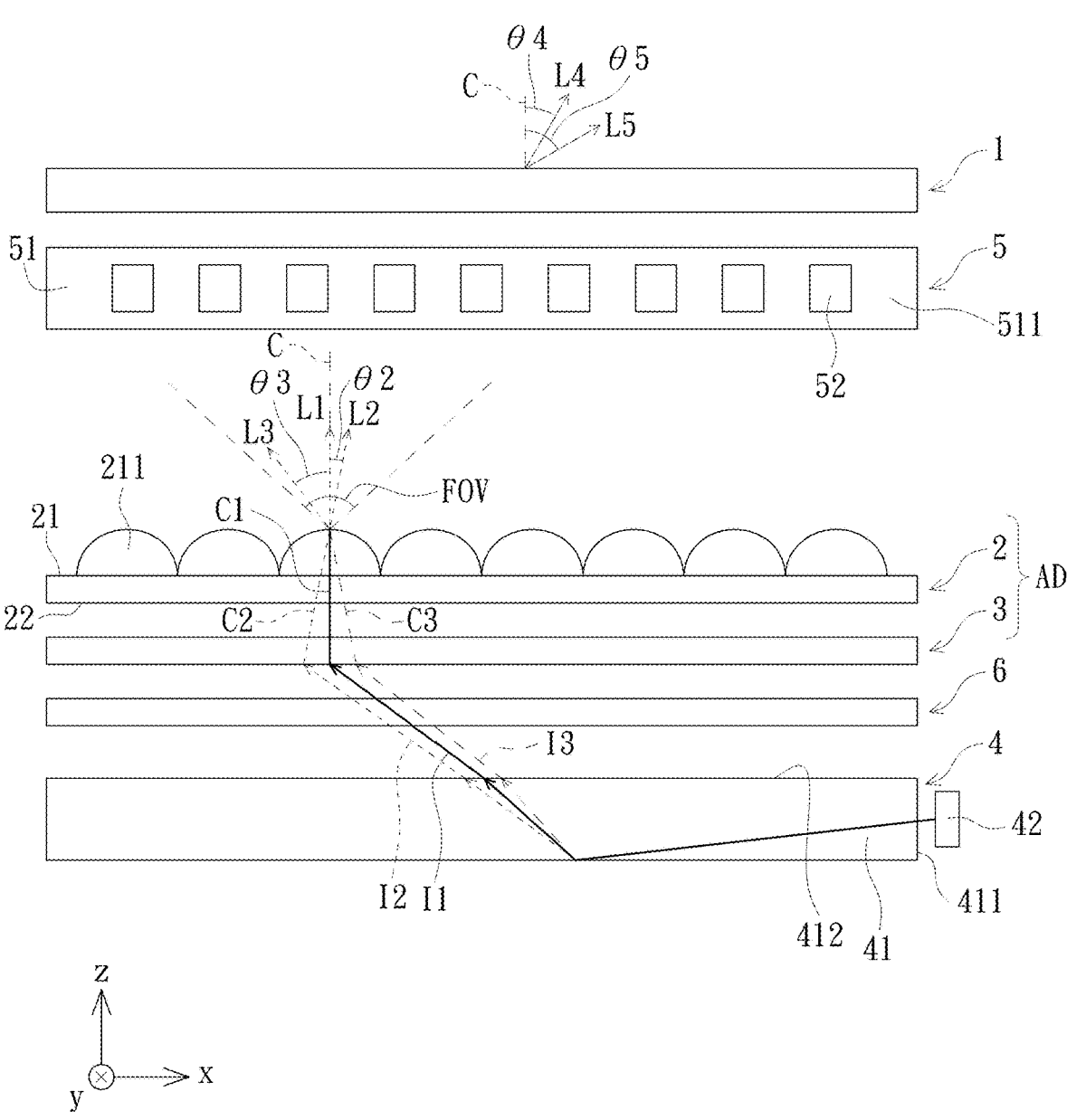
FIG. 7 is a schematic cross-sectional view of the display device along a plane XZ according to the second embodiment of the present invention.

FIG. 6 is a schematic three-dimensional diagram of a display device according to a second embodiment of the present invention. FIG. 7 is a schematic cross-sectional of the display device in FIG. 6 according to the second embodiment of the present invention. Refer to FIGS. 6 and 7. The display device 10B of the second embodiment is similar to the display device 10A shown in FIGS. 2 and 3, with the main difference being that the display device 10B further includes a second light emitting unit 5. The second light emitting unit 5 includes a second light guide plate 51 having a plurality of side surfaces 511 and a second light source 52 disposed on at least one side surface 511. In this embodiment, the plurality of second light sources 52 are disposed on one of the plurality of side surfaces 511 of the second light guide plate 51, but are not limited thereto. In other embodiments, the plurality of second light sources 52 may also be disposed on the plurality of side surfaces 511 of the second light guide plate 51 simultaneously. Furthermore, the display device 10B of this embodiment can switch between an anti-peep mode and a sharing mode. When the display device 10B is in the anti-peep mode, the first light emitting unit 4 is turned on but the second light emitting unit 5 is not, and the display device 10B is provided with a light source only by the first light emitting unit 4. The first light source 42 emits initial light beams I, which pass through the first light guide plate 41, the collimating optical layer 3, and the optical film 2 to form divergent light beams L1, L2, and L3. After the divergent light beams L are incident into the second light emitting unit 5 and the display panel 1, the emission angles of the light beams emitted by the first light source 42 are limited by the light modulation unit AD, thus forming the first emitted light beam L4. When the display device 10B is in the sharing mode, both the first light source 41 of the first light emitting unit 4 and the second light source 52 of the second light emitting unit 5 are turned on, and the display device 10B is provided with light sources by both the first light emitting unit 4 and the second light emitting unit 5. Because the light beams emitted by the second light source 52 do not pass through the light modulation unit AD, the light beams emitted by the second light source 52 pass through the display panel 1 to form the second emitted light beam L5. The first emitted light beam L4 and the second emitted light beam L5 have respective first maximum light emission angles θ4 and second maximum light emission angles θ5 relative to the normal C of the plane of the display panel 1 away from the light exit surface 21. The first maximum light emission angle θ4 is smaller than the second maximum light emission angle θ5. By selectively limiting the emission angles of the light beams, the user can switch between the privacy mode and the sharing mode as needed. The display device 10B can turn off the second light source 52 to limit the maximum emission angle of the light beams. For example, the first maximum light emission angle θ4 may be 10 degrees, 15 degrees, 20 degrees, 25 degrees, 30 degrees, 35 degrees, 40 degrees, or 45 degrees, achieving the anti-peep effect. The display device 10B can also turn on the second light source 52 and diffuse the light beams through the second light guide plate 51, thereby increasing the maximum emission angle of the light beams. For example, the second maximum light emission angle θ5 may be 90 degrees, providing the sharing function. The present invention does not limit the relative arrangement of the first light source 42 and the second light source 52. Both can be arranged on the same side or different sides of the display device 10B. The relationship between the viewing angle and brightness of the display device 10B of the second embodiment is similar to that of the first embodiment, and is not elaborated herein.

Figure 8:
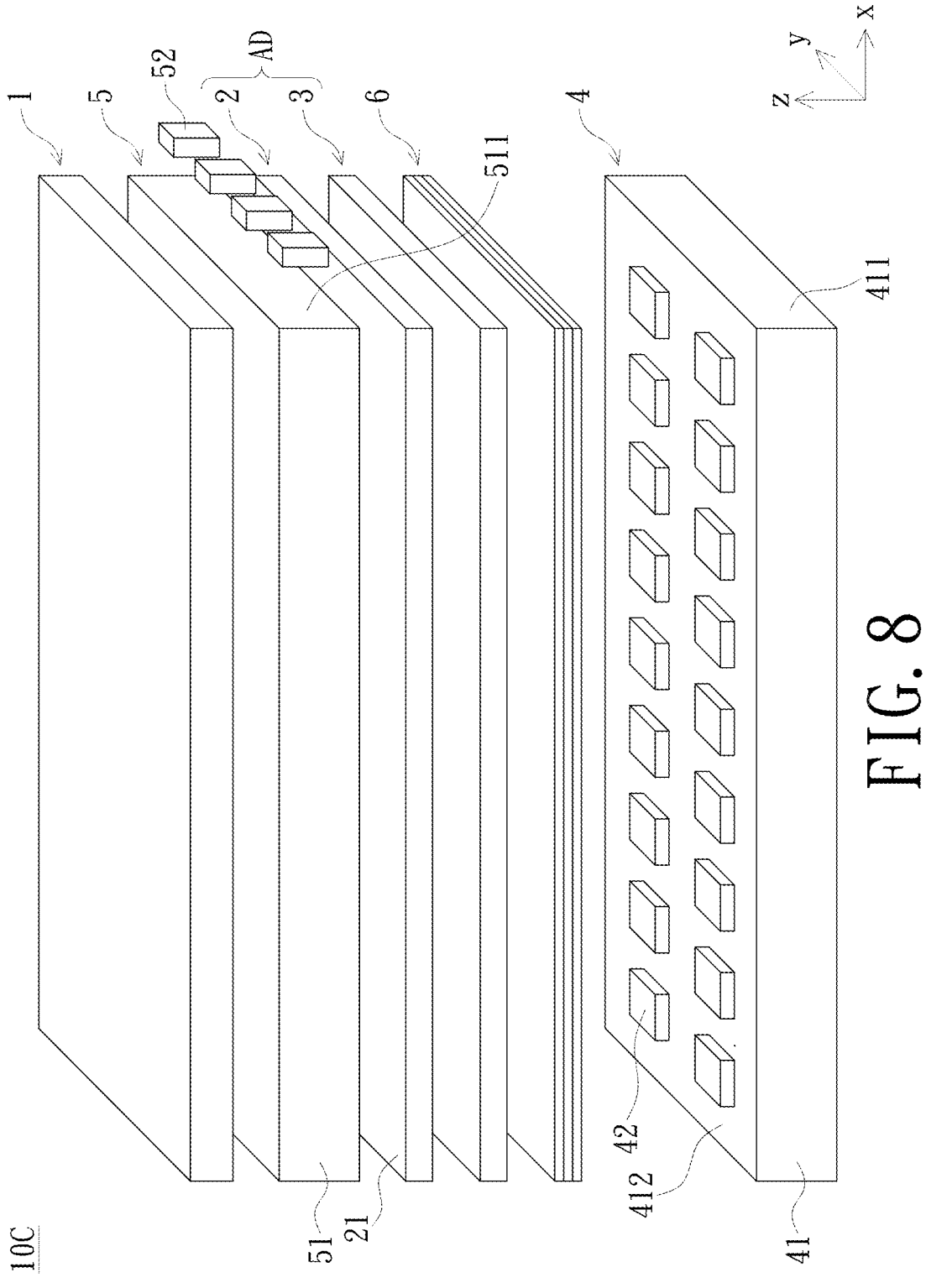
FIG. 8 is a schematic three-dimensional diagram of a display device according to a third embodiment of the present invention.
Figure 9:
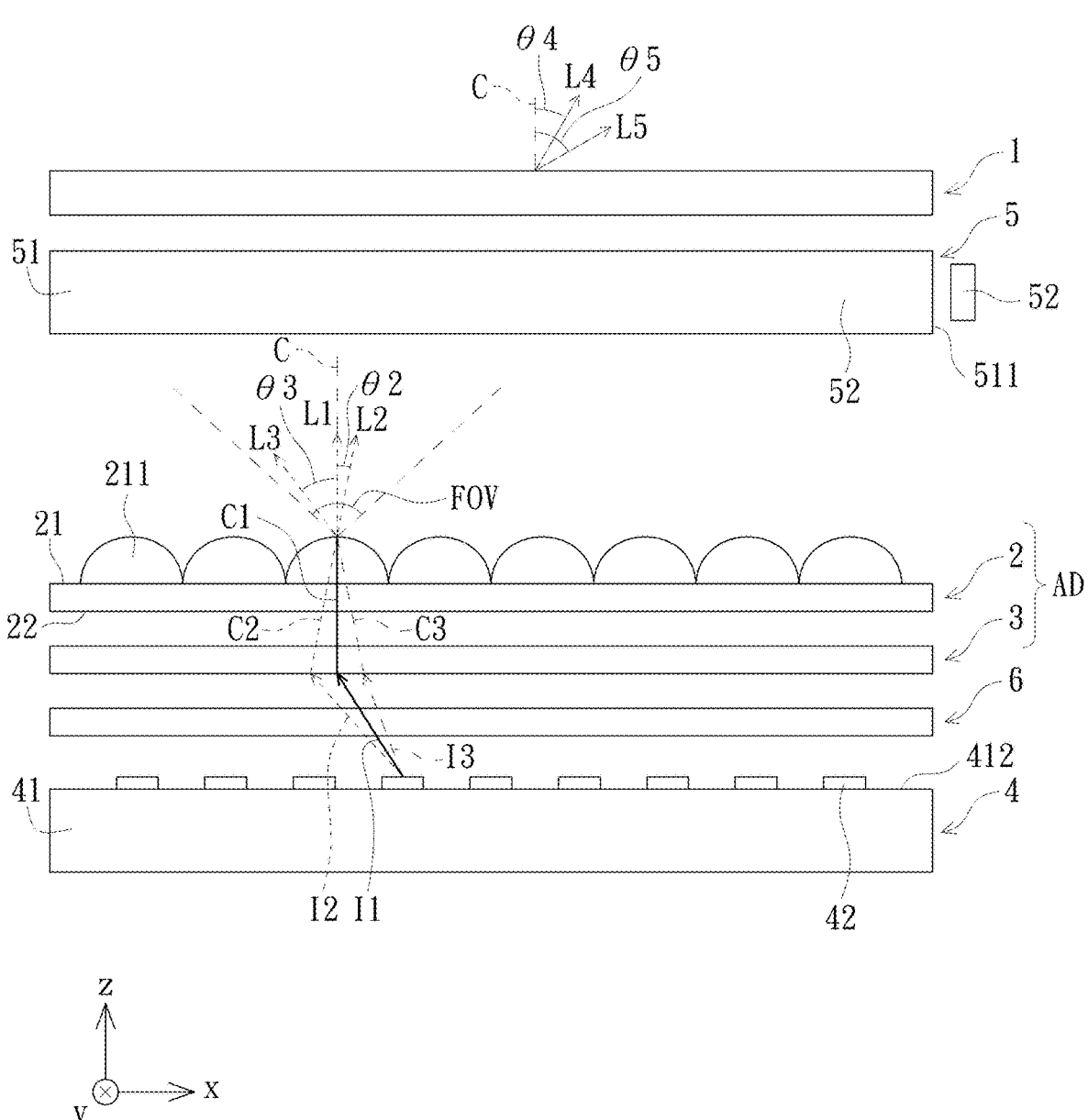
FIG. 9 is a schematic cross-sectional view of the display device along a plane XZ according to the third embodiment of the present invention.

Refer to FIGS. 8 and 9. The display device 10C of the third embodiment of the present invention is similar to the display device 10A shown in FIGS. 2 and 3, with the main difference being that the position of the first light source 42 of the first light emitting unit 4 is different. In the third embodiment, the first light guide plate 41 has an upper surface 412 adjacent to the collimating optical layer 3, and the plurality of first light sources 42 are disposed on the upper surface 412 of the first light guide plate 41. Furthermore, in this embodiment, the first light emitting unit 4 is a direct-lit light emitting unit, but is not limited thereto. In other embodiments, the first light emitting unit 4 may also be a side-lit light emitting unit or a full-array light emitting unit. In this embodiment, the display device also optionally includes a second light emitting unit 5. Through the configuration of the second light emitting unit 5, the display device 10C can be set to the privacy mode or the sharing mode as needed, with the implementation being similar to that of the display device 10B shown in FIGS. 6 and 7, which is not elaborated herein. The relationship between the viewing angle and brightness of the display device 10B of the third embodiment is similar to that of the first embodiment, and is not elaborated herein.

In summary, the display devices 10A, 10B, and 10C of the present invention achieve light type control through the design of the collimating optical layer 3 of the light modulation unit AD and the microstructures 211 of the optical film 2, limiting the brightness of the divergent light beam L3 with a divergence angle θ3 and increasing the brightness of the divergent light beam L2 with a divergence angle θ2. Under the premise of achieving the anti-peep effect, the brightness difference between orthogonal angles is reduced, helping to enhance the viewing comfort of the user at the orthogonal angle.

Furthermore, with the arrangement of the second light emitting unit 5, the display devices 10A, 10B, and 10C of the present invention can also provide the user the option to freely switch between the anti-peep mode and the sharing mode. When the first light source 42 is turned on and the second light source 52 is turned off, the emission angles of the light beams can be limited to provide the anti-peep function. When both the first light source 42 and the second light source 52 are turned on, the light beams can be diffused through the second light guide plate 52 to increase the emission angles of the light beams, thereby achieving the anti-peep effect.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A light modulation unit, comprising:

an optical film, having a light exit surface and a light entrance surface opposite to the light exit surface, wherein the light exit surface forms a plurality of microstructures, each of the microstructures has a boundary connected to a boundary of a microstructure adjacent thereto, an orthographic projection of the boundary of the microstructure on the light exit surface is polygonal, the microstructures each have a height (h) in a normal direction of the light exit surface, the microstructures each also have a virtual aperture (φ) in an x-coordinate axis direction parallel to the light exit surface, and a ratio (h/φ) of the height (h) to the virtual aperture (φ) is 0.2 to 1; and a collimating optical layer, arranged opposite to the light entrance surface of the optical film;

wherein the collimating optical layer is an anti-peep film.

2. The light modulation unit according to claim 1, wherein the ratio (h/φ) of the height (h) to the virtual aperture (φ) is 0.3 to 0.7.

3. The light modulation unit according to claim 1, wherein the microstructures each have a surface profile, and the surface profile satisfies the following functional form:

$$s(x) = \frac{x^2}{R + \sqrt{R^2 + (k+1)x^2}}$$

wherein s(x) represents the surface profile of each of the microstructures in an x-coordinate axis, value x represents a position of a vertical projection of the surface profile on the x-coordinate axis, value R represents a curvature radius of a vertex of each of the microstructures, value k represents a conic constant of each of the microstructures, and the microstructures have the same value R and value k.

4. The light modulation unit according to claim 3, wherein a ratio (k/R) of the conic constant to the curvature radius satisfies the following condition:

$$-187.5 \ 1/\mu m \le k/R \le -20 \ 1/\mu m.$$

5. The light modulation unit according to claim 3, wherein the microstructures are each suitable for forming a light type, the light type has a viewing angle, and the viewing angle satisfies the following functional form:

$$FOV = A(k/R) + B$$

wherein FOV represents the viewing angle of the light type, value A and value B satisfy the following condition: $-0.1 \leq A \leq -1$, and B is a constant greater than 0.

6. The light modulation unit according to claim 3, wherein the conic constant k satisfies the following condition: $-1.5 \leq k \leq -0.8$.

7. The light modulation unit according to claim 3, wherein the curvature radius R satisfies the following condition: $0.008 \ \mu m \leq R \leq 0.04 \ \mu m$.

8. The light modulation unit according to claim 1, wherein the virtual aperture (φ) of each of the microstructures satisfies the following condition: $10 \ \mu m \leq \varphi \leq 250 \ \mu m$.

9. The light modulation unit according to claim 3, wherein the virtual aperture (φ) of each of the microstructures is a difference between two adjacent values x when the functional form s(x) of the surface profile is 0 and satisfies the following condition: $10 \ \mu m \leq \varphi \leq 250 \ \mu m$.

10. The light modulation unit according to claim 1, wherein the height (h) of each of the microstructures satisfies the following condition: $10 \ \mu m \leq h \leq 50 \ \mu m$.

11. The light modulation unit according to claim 3, wherein the height (h) of each of the microstructures is a maximum value of the functional form s(x) of the surface profile and satisfies the following condition: $10 \ \mu m \leq h \leq 50 \ \mu m$.

12. The light modulation unit according to claim 1, wherein the microstructures protrude from or recess into the light exit surface.

13. The light modulation unit according to claim 1, wherein a material of the optical film is at least one of polycarbonate, polyethylene terephthalate, polypropylene, polyvinyl chloride, or polydimethylsiloxane.

14. A display device, comprising:
a light modulation unit, comprising:
an optical film, having a light exit surface and a light entrance surface opposite to the light exit surface, wherein the light exit surface forms a plurality of microstructures, each of the microstructures has a boundary connected to a boundary of a microstructure adjacent thereto, an orthographic projection of the boundary of the microstructure on the light exit surface is polygonal, the microstructures each have a height (h) in a normal direction of the light exit surface, the microstructures each also have a virtual aperture (φ) in an x-coordinate axis direction parallel to the light exit surface, and a ratio (h/φ) of the height (h) to the virtual aperture (φ) is 0.2 to 1; and
a collimating optical layer, arranged opposite to the light entrance surface of the optical film;
a display panel, opposite to the light exit surface of the optical film; and
a first light emitting unit, arranged opposite to the collimating optical layer of the light modulation unit, and the light modulation unit being located between the display panel and the first light emitting unit; wherein the first light emitting unit emits an initial light beam to the collimating optical layer, the initial light beam passes through the collimating optical layer to form a collimated beam, the collimated beam passes through the light entrance surface to enter the optical film and then exits from the microstructures of the light exit surface to form a divergent light beam, and the divergent light beam has a divergence angle relative to a normal of the light entrance surface;

the display device further comprising a second light emitting unit disposed between the display panel and the optical film, wherein the second light emitting unit comprises a second light guide plate and at least one second light source disposed on at least one side surface of the second light guide plate, wherein the display device is able to switch between a plurality of modes comprising:

a privacy mode: when the first light emitting unit is turned on and the second light emitting unit is turned off, the divergent light beam passes through the second light emitting unit and the display panel to form a first emitted light beam, and the first emitted light beam has a first maximum light emission angle relative to a normal of a plane of the display panel away from the light exit surface; and a sharing mode: when the first light emitting unit is turned on and the second light emitting unit is turned on, at least one light beam emitted by the second light emitting unit passes through the second light emitting unit and the display panel to form a second emitted light beam, the second emitted light beam has a second maximum light emission angle relative to the normal of the plane of the display panel away from the light exit surface, and the first maximum light emission angle is less than the second maximum light emission angle.

15. The display device according to claim 14, wherein the first light emitting unit comprises:
a first light guide plate, having at least one side surface; and
at least one first light source, disposed on the at least one side surface of the first light guide plate.

16. The display device according to claim 14, wherein the first light emitting unit comprises:
a first light guide plate, having an upper surface close to the collimating optical layer; and
at least one first light source, disposed on the upper surface of the first light guide plate.

17. The display device according to claim 14, wherein when the divergence angle θ is 0 degrees, the divergent light beam has first brightness; and when 0 degrees $< \theta \leq 20$ degrees or $-20$ degrees $\leq \theta < 0$ degrees, the divergent light beam has second brightness, and the second brightness is 90% to 105% of the first brightness.

\* \* \* \* \*